(12) United States Patent
Watanabe et al.

(10) Patent No.: US 7,652,710 B2
(45) Date of Patent: Jan. 26, 2010

(54) CAMERA WITH PHOTOMETRIC FUNCTION AND OPTICAL ELEMENT FOR CAMERA

(75) Inventors: Masachika Watanabe, Tokyo (JP); Yasuyuki Oyagi, Tokyo (JP); Norihisa Moriya, Tokyo (JP); Toru Iwane, Yokohama (JP)

(73) Assignees: Dai Nippon Printing Co., Ltd., Tokyo (JP); Nikon Corporation, Tokyo (JP)

( * ) Notice: Subject to any disclaimer, the term of this patent is extended or adjusted under 35 U.S.C. 154(b) by 406 days.

(21) Appl. No.: 11/821,387

(22) Filed: Jun. 22, 2007

(65) Prior Publication Data

US 2008/0002047 A1    Jan. 3, 2008

(30) Foreign Application Priority Data

Jun. 30, 2006   (JP) .............................. 2006-181096

(51) Int. Cl.
*H04N 5/222* (2006.01)
(52) U.S. Cl. ................... 348/333.09; 348/335
(58) Field of Classification Search ............ 348/333.01, 348/333.08, 333.09, 335; 396/296
See application file for complete search history.

(56) References Cited

U.S. PATENT DOCUMENTS

| 5,235,380 A | * | 8/1993 | Yamada et al. .............. 396/289 |
| 5,506,704 A | | 4/1996 | Broer et al. |
| 5,793,456 A | | 8/1998 | Broer et al. |
| 6,047,139 A | * | 4/2000 | Suda .......................... 396/296 |
| 2007/0009255 A1 | * | 1/2007 | Iwane .......................... 396/296 |

FOREIGN PATENT DOCUMENTS

JP       3224467       8/2001

* cited by examiner

*Primary Examiner*—Tuan Ho
(74) *Attorney, Agent, or Firm*—Ladas & Parry LLP

(57) ABSTRACT

Optical system for guiding subject light incident through a photo-taking lens 20 toward a finder 100 through a prism 90 is prepared and a plate-like diffractive element 50 is provided on the optical path. Light from an LED 70 to be turned on when a focusing state is achieved is introduced into the plate-like diffractive element 50 via a light guide member 60, and "auxiliary light indicating a focusing state" to travel upward in the drawing from the plate-like diffractive element 50 is generated and synthesized with the subject light. The auxiliary light shall have a linear polarization property. The subject image and the focusing state indication can be visually recognized on the finder 100. Part of the light toward the finder 100 is branched through a mirror 110 and then guided toward photometric unit 140. Auxiliary light separating unit 130 for excluding auxiliary light based on the difference in polarization property is provided in front of the photometric unit 140.

15 Claims, 3 Drawing Sheets

CAMERA WITH PHOTOMETRIC FUNCTION AND OPTICAL ELEMENT FOR CAMERA

BACKGROUND OF THE INVENTION

The present invention relates to cameras with a photometric function and, in particular, to a camera with a photometric function having a function of displaying auxiliary information such as a focusing state and/or a focusing position in a superimposed manner on a subject image on a finder, and to an optical element for use in the camera.

Currently, many cameras have automatic focusing (AF) and automatic exposure (AE) functions, and it is necessary to present various information related to these functions to photographers. In addition, other various information such as the maximum number of shots, remaining battery power, and operating state of the flash should be presented to photographers. In the case of cameras including a finder, the information is commonly displayed in a superimposed manner on a subject image on the finder. Photographers may look into the finder to acquire the subject image (primary information necessary for photographing) and the accompanying information (hereinafter referred to as auxiliary information) at the same time.

For example, Japanese Patent Laid-open Publication No. 2002-072331A discloses a technique for displaying information about a focus detection area in a superimposed manner on a subject image on the finder. Japanese Patent Laid-open Publication No. 2004-133346A also discloses a technique for displaying various auxiliary information in a superimposed manner on a subject image on the finder by forming a projection image of the auxiliary information on the focusing screen.

Cameras with an automatic exposure (AE) function require photometric means to determine correct exposure. There are a number of such photometric means having a function of measuring the intensity of subject light incident through a photo-taking lens and employing a mechanism, due to its structure, for extracting part of the subject light toward the finder as branched light and measuring the intensity of the branched light. However, in the case of displaying various auxiliary information in a superimposed manner on a subject image on the finder, light toward the finder results in containing not only subject light for essential intensity measurement but also light for displaying the auxiliary information. For example, in the case of cameras incorporating an LED to be turned on when a focusing state is achieved and having a function of guiding light from the LED toward the finder and confirming on the finder whether the LED is turned on or off, subject light could not be measured accurately with entrance of light from the LED into photometric means.

In order to solve such a problem, Japanese Patent Laid-open Publication No. 2004-133346A, for example, also discloses a technique for disabling AF and AE functions while auxiliary information is displayed on the finder. This kind of time sharing control can prevent light for displaying the auxiliary information from affecting the photometric function for AE. However, the function of displaying the auxiliary information on the finder and the photometric function for AE cannot be utilized simultaneously, which exhibits a negative impact in that various restrictions are imposed on usage pattern.

SUMMARY OF THE INVENTION

Hence, it is an object of the present invention to provide a camera with a photometric function in which light can be measured accurately even if a function of displaying auxiliary information on the finder and a photometric function for AE may be utilized simultaneously, and to provide an optical element for use in the camera.

(1) The first feature of the present invention resides in a camera with a photometric function comprising:

an optical system guiding subject light incident through a photo-taking lens toward a finder;

an auxiliary light synthesizing unit generating auxiliary light to display auxiliary information in a superimposed manner on a subject image on the finder and generating synthetic light by synthesizing the subject light with the auxiliary light;

a light branching unit extracting part of the synthetic light toward the finder as branched light; and a photometric unit measuring an intensity of the branched light to determine correct exposure, wherein the auxiliary light synthesizing unit has a function of generating the synthetic light in which the subject light and the auxiliary light have their respective different polarization properties, and an auxiliary light separating unit separating the subject light and the auxiliary light based on the different polarization properties is provided between the light branching unit and the photometric unit so that light excluding the auxiliary light is incident on the photometric unit.

(2) The second feature of the present invention resides in a camera with a photometric function according to the first feature, wherein auxiliary information indicating a focusing state or a focusing position is displayed in a superimposed manner on a subject image on the finder.

(3) The third feature of the present invention resides in a camera with a photometric function according to the first or second feature, wherein the auxiliary light synthesizing unit has a function of generating synthetic light by synthesizing non-polarized subject light with linearly-polarized auxiliary light, and the auxiliary light separating unit is adapted to exclude the auxiliary light based on the linear polarization property of the auxiliary light.

(4) The fourth feature of the present invention resides in a camera with a photometric function according to the third feature, wherein the auxiliary light synthesizing unit comprises:

an LED light source for generating auxiliary light;

a transparent plate-like diffractive element having a flat plate structure with an XY plane as a principal plane and having a function of diffracting light introduced through a side surface thereof at any coordinate point (x, y) to introduce light outside as linearly-polarized auxiliary light; and a light guide member for guiding light generated in the LED light source toward the side surface of the plate-like diffractive element.

(5) The fifth feature of the present invention resides in a camera with a photometric function according to the fourth feature, wherein the plate-like diffractive element comprises:

a liquid-crystal main body layer composed of liquid crystal filling a plate-like area;

an upper electrode layer disposed on an upper surface of the liquid-crystal main body layer and having an entirely transparent plate-like structure with many transparent linear electrodes formed parallel with a Y axis direction; and a lower electrode layer disposed on a lower surface of the liquid-crystal main body layer and having an entirely transparent plate-like structure with many transparent linear electrodes formed parallel with an X axis direction, the plate-like diffractive element having a feature that light introduced into the liquid-crystal main body layer is diffracted and output in a direction of a Z axis at an intersection of a pair of certain transparent linear electrodes selected from the transparent linear electrodes formed in the respective upper and lower electrode layers by applying a predetermined drive voltage between the pair of selected transparent linear electrodes.

(6) The sixth feature of the present invention resides in a camera with a photometric function according to the first to fifth features, wherein the auxiliary light separating unit is a polarizing plate.

(7) The seventh feature of the present invention resides in a camera with a photometric function according to the first to fifth features, wherein the auxiliary light separating unit is a polarization separating element of cholesteric liquid crystal.

(8) The eighth feature of the present invention resides in a camera with a photometric function according to the third to fifth features, wherein the auxiliary light separating unit is a laminated structure including a plate-like polarization separating element of cholesteric liquid crystal and a ¼-wavelength plate.

(9) The ninth feature of the present invention resides in a camera with a photometric function according to the eighth feature, wherein the auxiliary light synthesizing unit has a wavelength characteristic mainly within a certain wavelength range and has a function of generating linearly-polarized auxiliary light, and the plate-like polarization separating element of cholesteric liquid crystal has a feature of selectively reflecting circularly-polarized light within the certain wavelength range and is adapted to guide light passing through the plate-like polarization separating element toward the photometric unit.

(10) The tenth feature of the present invention resides in an optical element for use in a camera with a photometric function, said camera comprising:

an optical system guiding subject light incident through a photo-taking lens toward a finder;

an auxiliary light synthesizing unit generating auxiliary light to display auxiliary information in a superimposed manner on a subject image on the finder and generating synthetic light in which the subject light and the auxiliary light have their respective different polarization properties by synthesizing the subject light with the auxiliary light;

a light branching unit extracting part of the synthetic light toward the finder as branched light; and a photometric unit measuring an intensity of the branched light to determine correct exposure, wherein said optical element having a shape suitable to be arranged between the light branching unit and the photometric unit and having an optical characteristic of separating the subject light and the auxiliary light based on the different polarization properties so that light excluding the auxiliary light is incident on the photometric unit.

(11) The eleventh feature of the present invention resides in an optical element for use in a camera with a photometric function according to the tenth feature, wherein light having a linear polarization property is adapted to be excluded, while light having no linear polarization property is adapted to be guided toward the photometric unit based on the linear polarization property of the auxiliary light.

(12) The twelfth feature of the present invention resides in an optical element for use in a camera with a photometric function according to the eleventh feature, wherein light having a linear polarization property is adapted to be separated using a polarization separating element of cholesteric liquid crystal.

(13) The thirteenth feature of the present invention resides in an optical element for use in a camera with a photometric function according to the twelfth feature, wherein a laminated structure including a plate-like polarization separating element of cholesteric liquid crystal and a ¼-wavelength plate is provided.

(14) The fourteenth feature of the present invention resides in an optical element for use in a camera with a photometric function according to the thirteenth feature, wherein the plate-like polarization separating element of cholesteric liquid crystal has a feature of selectively reflecting circularly-polarized light within a certain wavelength range of the auxiliary light.

In accordance with a camera with a photometric function according to the present invention, auxiliary light for displaying auxiliary information has a polarization property different from that of subject light, and auxiliary light separating means provided in front of photometric means is adapted to prevent the auxiliary light from entering the photometric means based on the difference in the polarization property, whereby light can be measured accurately even if a function of displaying auxiliary information on the finder and a photometric function for AE may be utilized simultaneously.

DETAILED DESCRIPTION OF THE PREFERRED EMBODIMENTS

Figure 1:
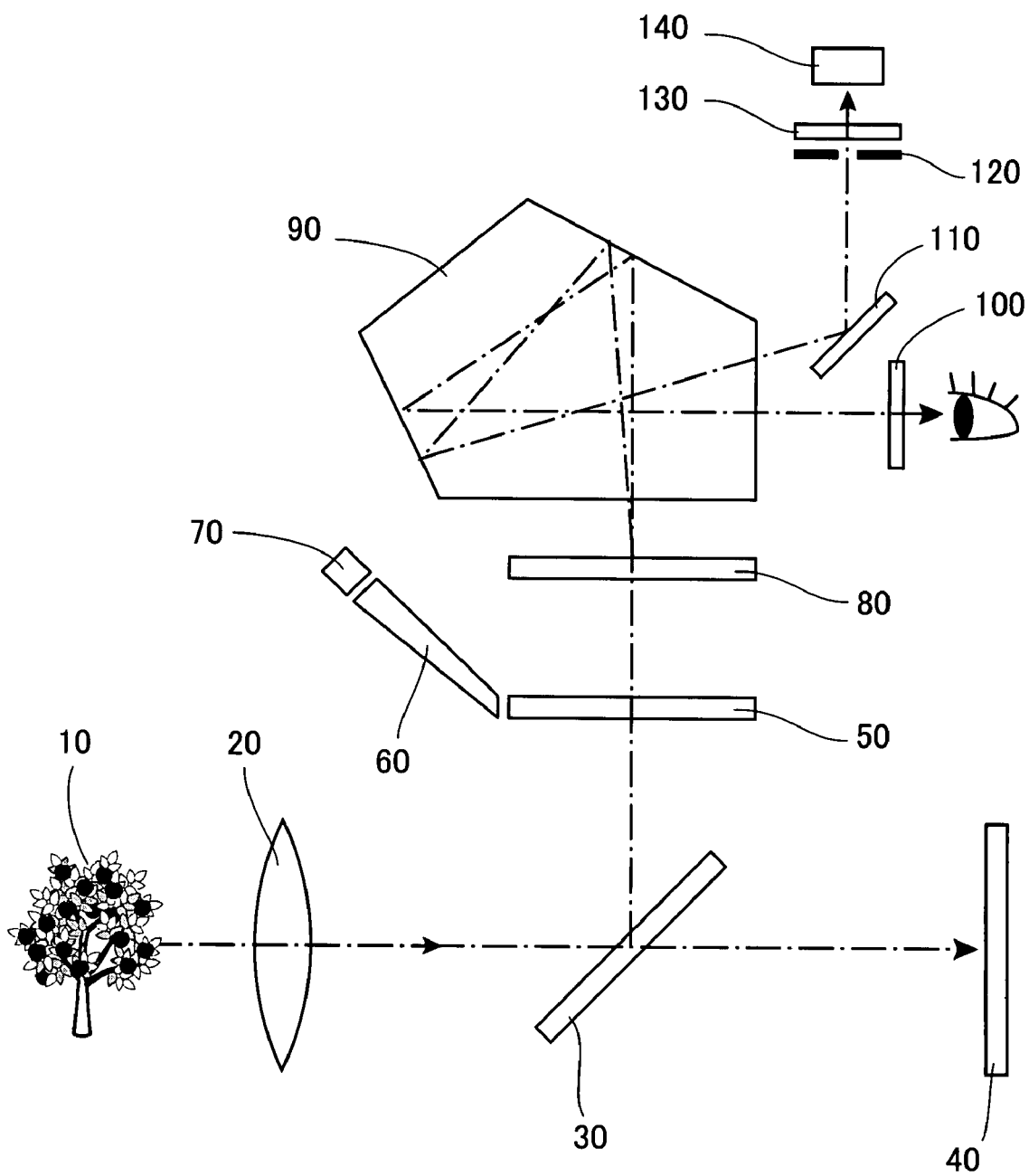
FIG. 1 is a side elevational basic configuration diagram showing the arrangement of key components in a camera with a photometric function according to a basic embodiment of the present invention.

The present invention will hereinafter be described with reference to illustrative embodiments. FIG. 1 is a side elevational basic configuration diagram showing the arrangement of key components in a single-lens reflex camera with a photometric function according to a basic embodiment of the present invention. This drawing schematically shows essential components of the present invention and components necessary to describe the functions of the essential components, not showing all the components necessary for the camera. It is noted that the alternate long and short dash line in the drawing indicates an optical path.

Subject light from a subject 10 reaches a reflecting mirror 30 through a photo-taking lens 20. Since the reflecting mirror 30 is regularly arranged in the position shown in the drawing, the subject light is reflected at the reflecting mirror 30 to travel upward in the drawing. At the moment of a shutter operation by a photographer, the reflecting mirror 30 is displaced from the position shown in the drawing for a short period of time corresponding to a predetermined shutter speed, so that the subject light reaches a CCD element 40. As a result, an image of the subject 10 is formed on the surface of the CCD element 40 for photographing.

It is noted that the present invention is not restricted to cameras using a CCD element 40, but may be applied similarly to cameras using various imaging elements instead of a CCD element. The present invention may also be applied to so-called silver halide cameras, and in this case, a silver halide film is arranged at the position of the CCD element 40 in the drawing.

Now, in a regular state with no shutter operation, the subject light is reflected at the reflecting mirror 30 to travel upward in the drawing and then pass through a plate-like diffractive element 50 as shown in the drawing. Although light from an LED light source 70 is introduced into the plate-like diffractive element 50 through a light guide member 60 as shown in the drawing, the plate-like diffractive element 50 functions as a transparent plate for subject light traveling upward from the lower side in the drawing. The structure and function of the plate-like diffractive element 50 will hereinafter be described in detail.

The subject light passing through the plate-like diffractive element 50 is projected on a focusing screen 80 and a projection image of the subject 10 is formed thereon. Light from the projection image on the focusing screen 80 is guided toward a finder 100 through a prism 90. The photographer who looks into the finder 100 can observe the projection image on the focusing screen 80 as a subject image.

Meanwhile, the focusing screen 80 functions also as light branching means, and part of the light from the projection image formed on the focusing screen 80 travels toward a branched light mirror 110 as branched light and then passes through an aperture formed in the center of a light shielding plate 120 and auxiliary light separating means 130 to be described later to enter photometric means 140. The photometric means 140 is adapted to measure the intensity of the branched light to determine correct exposure for AE, and being specifically, constructed as an optical power meter.

Accordingly, this camera includes optical means for guiding subject light incident through the photo-taking lens 20 toward the finder 100 and light branching means for extracting part of the light toward the finder 100 as branched light, whereby an image of the subject 10 can be observed by looking into the finder 100 and the intensity of the branched light can be measured by the photometric means 140 to determine correct exposure.

In the arrangement above, if an image of the subject 10 is only projected on the focusing screen 80, the measurement result by the photometric means 140 is correct. However, this camera has a function of displaying auxiliary information on the finder, and the auxiliary information may have a negative impact on the measurement result by the photometric means 140 as will be described hereinafter. The plate-like diffractive element 50, light guide member 60, and LED light source 70 shown in the drawing fulfill the function of displaying auxiliary information, and this group of components will here be referred to as auxiliary light synthesizing means.

In the present application, "auxiliary light" means "light for displaying auxiliary information in a superimposed manner on a subject image on the finder 100" and should be separated from "subject light" introduced through the photo-taking lens 20. The auxiliary light synthesizing means fulfills a function of generating auxiliary light and generating synthetic light by synthesizing the subject light reflected at the reflecting mirror 30 with the generated auxiliary light. The specific configuration and function of the auxiliary light synthesizing means will hereinafter be described in detail.

Various auxiliary information should be presented in a superimposed manner on a subject image on the finder 100. Information about a focusing state and a focusing position serves as prime examples of such auxiliary information. The information about a focusing state can show the photographer that auto focusing by the AF function is complete, that is, a focusing state is achieved by, for example, displaying an LED transiting from an off-state to an on-state on the finder 100. On the other hand, the information about a focusing position can show for which part of the subject 10 auto focusing by the AF function is performed. For example, by displaying an LED luminescent at a predetermined position on the finder 100, it can be shown that auto-focusing is performed for the predetermined position.

In addition, other various auxiliary information such as the maximum number of shots, remaining battery power, and operating state of the flash should be presented to the photographer. When such auxiliary information is displayed in a superimposed manner on a subject image on the finder 100, the photographer can acquire the subject image and the auxiliary information only by looking into the finder 100. However, the existence of displaying such auxiliary information becomes a hindrance for the photometric means 140. That is, in order to display auxiliary information in a superimposed manner on a subject image on the finder 100, it is necessary to superimpose the auxiliary information on a subject image on the focusing screen 80. This, however, results in that both the subject image and the auxiliary information are observed when looking into the finder 100, while that the subject light as well as the auxiliary light enter the photometric means 140. Therefore, the measurement result by the photometric means 140 does not represent the original brightness of the subject 10 but additionally includes the brightness of the auxiliary information.

One approach for solving such a problem would be to employ a time sharing system in which the photometric means 140 is not operated while the auxiliary information is displayed, and on the contrary, the auxiliary information is not displayed while the photometric means 140 is operated. However, in such a time sharing system, the function of displaying the auxiliary information on the finder and the photometric function for AE cannot be utilized simultaneously, which exhibits a negative impact in that various restrictions are imposed on usage pattern. In particular, auxiliary information such as a focusing state and/or a focusing position, which should be displayed while the photographer looks into the finder to determine the position of the subject, is preferably displayed while the photometric function for AE operates.

The present invention takes another approach and thereby proposes a technique whereby light can be measured accurately even if a function of displaying auxiliary information on the finder and a photometric function for AE may be utilized simultaneously. An important point of the present invention is that the auxiliary light synthesizing means (constituted by the plate-like diffractive element 50, light guide member 60, and LED light source 70 shown in FIG. 1) having a function of generating synthetic light by synthesizing subject light with auxiliary light also has a function of generating synthetic light in which subject light and auxiliary light have different polarization properties from each other, and that the auxiliary light separating means 130 for separating the subject light and the auxiliary light based on the different polarization properties is provided between the light branching means (constituted by the focusing screen 80, prism 90, and branched light mirror 110 shown in FIG. 1) for extracting part of the synthetic light toward the finder as branched light and the photometric means 140 so that light excluding the auxiliary light is incident on the photometric means 140.

Figure 2:
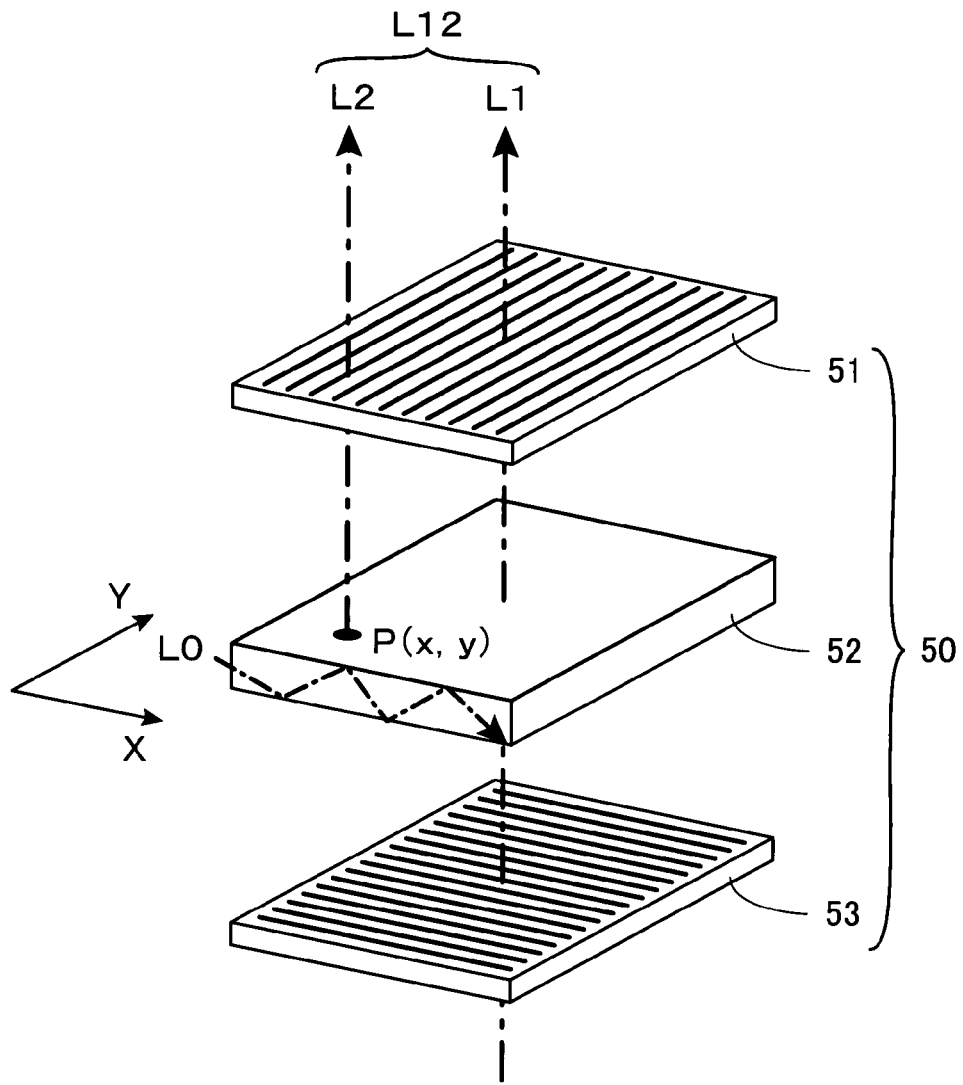
FIG. 2 is an exploded perspective view showing a configuration example of the plate-like diffractive element 50 shown in FIG. 1.

FIG. 2 is an exploded perspective view showing a configuration example of the plate-like diffractive element 50 shown in FIG. 1 (layers 51, 52, and 53 are actually coupled to each other). The plate-like diffractive element 50 has a function of generating synthetic light L12 by synthesizing non-polarized subject light L1 introduced through the photo-taking lens 20 and reflected at the reflecting mirror 30 with linearly-polarized auxiliary light L2. The synthetic light L12 is scattered at the focusing screen 80 to partially travel toward the finder 100, while the other part is reflected at the branched light mirror 110 to travel toward the photometric means 140. Hence, if the auxiliary light separating means 130 is an optical element having a function of extruding the auxiliary light based on the linear polarization property thereof, the auxiliary light can be excluded from the light incident on the photometric means 140.

That is, in FIG. 2, the synthetic light L12 output from the plate-like diffractive element 50 contains subject light L1 and auxiliary light L2, where the subject light L1 is non-polarized (i.e. general light having no particular polarization property, in other words, a set of lights having various polarization properties), while the auxiliary light L2 is linearly-polarized with a certain oscillating plane. Therefore, excluding linearly-polarized components having the certain oscillating plane in the auxiliary light separating means 130 allows only the subject light L1 to be incident on the photometric means 140.

As shown in FIG. 2, the plate-like diffractive element 50 is a transparent laminated structure including three layers of an upper electrode layer 51, a liquid-crystal main body layer 52, and a lower electrode layer 53. The liquid-crystal main body layer 52 is composed of liquid crystal filled between the upper and lower electrode layers 51 and 53 that are arranged with a predetermined space therebetween. In other words, the liquid-crystal main body layer 52 is composed of liquid crystal filled in the plate-like area. For the sake of descriptive convenience, here will be defined an XY orthogonal coordinate system on the upper surface of the liquid-crystal main body layer 52 as shown in the drawing. The upper electrode layer 51 is disposed on the upper surface of the liquid-crystal main body layer 52 and has an entirely transparent plate-like structure with many transparent linear electrodes formed parallel with the Y axis direction. On the other hand, the lower electrode layer 53 is disposed on the lower surface of the liquid-crystal main body layer 52 and has an entirely transparent plate-like structure with many transparent linear electrodes formed parallel with the X axis direction. The upper and lower electrode layers 51 and 53 each can be constructed by, for example, forming transparent linear electrodes made of ITO, etc., on a glass substrate.

Meanwhile, the light guide member 60 shown in FIG. 1 is arranged on the side surface of the plate-like diffractive element 50, and light generated in the LED light source 70 is guided toward the side surface of the plate-like diffractive element 50. More specifically, the light guide member 60 fulfills a function of introducing light L0 from the LED light source 70 inside through the side surface of the liquid-crystal main body layer 52. The light guide member 60 may be formed with a transparent member such as glass having such a lateral shape as shown in FIG. 1. The alternate long and short dash line in FIG. 2 indicates an exemplary optical path of the light L0 introduced into the inside of the liquid-crystal main body layer 52.

The plate-like diffractive element 50 has a function of generating auxiliary light L2 from the light L0 introduced into the inside of the liquid-crystal main body layer 52 and generating and outputting the auxiliary light L2 in the direction of the Z axis (upward in the drawing) at any point. That is, the plate-like diffractive element 50 has a flat plate structure with the XY plane as a principal plane, as shown in the drawing, with the ability of introducing light through the side surface thereof and has a function of diffracting the introduced light at any coordinate point (x, y) to output the light in the direction of the Z axis as auxiliary light. The drawing shows a state where the auxiliary light L2 is output in the direction of the Z axis at any point P (x, y). The auxiliary light L2 is a diffracted part of the light L0 introduced into the inside of the liquid-crystal main body layer 52 traveling in the direction of the Z axis.

On the other hand, the subject light L1 traveling from below to above in the drawing is adjusted to travel in the direction perpendicular to the principal plane of the plate-like diffractive element 50 (i.e. in the direction of the Z axis). Since the plate-like diffractive element 50 functions as an entirely transparent plate for the thus traveling subject light L1, the subject light L1 passes directly through the plate-like diffractive element 50 as shown in the drawing. Consequently, the subject light L1 and the auxiliary light L2 are output from the upper surface of the plate-like diffractive element 50 as synthetic light L12 in the direction of the Z axis.

In order that the auxiliary light L2 is thus output in the direction of the Z axis at any point P (x, y), a certain transparent linear electrode (arranged in a position corresponding to the coordinate value "x") formed in the upper electrode layer 51 and a certain transparent linear electrode (arranged in a position corresponding to the coordinate value "y") formed in the lower electrode layer 53 are preferably selected, and also a drive control is performed in which a predetermined drive voltage is applied between the pair of selected transparent linear electrodes (no circuit for performing such a drive control is shown in the drawing). This drive control causes the light L0 introduced into the liquid-crystal main body layer 52 to be diffracted and output in the direction of the Z axis as auxiliary light L2 at the intersection P (x, y) of the pair of transparent linear electrodes.

Here, the point P (x, y) at which the auxiliary light L2 is output may be set arbitrarily by selecting transparent linear electrodes to be applied with a drive voltage. The auxiliary light L2 is applied at a corresponding point on the focusing screen 80 and a projection image of the light is formed. Therefore, in addition to the projection image of the subject 10, the projection image of the auxiliary light L2 is to be observed at a point corresponding to the output point P (x, y) on the focusing screen 80 through the finder 100.

Figure 3:
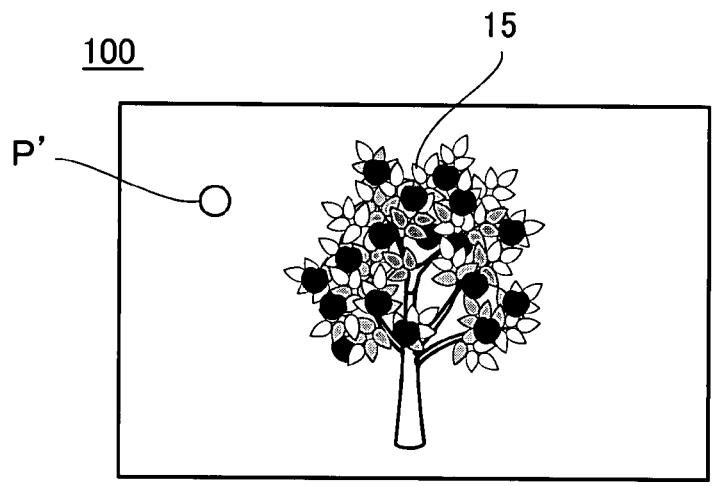
FIG. 3 is a plan view showing a display example on the finder 100 shown in FIG. 1.

FIG. 3 is a plan view showing a display example on the finder 100 when the auxiliary light L2 is output at the point P shown in FIG. 2. As shown in this drawing, a subject image 15 and a projection image P' of the auxiliary light L2 are displayed in a superimposed manner on the finder. The projection image P' is obtained at a point corresponding to the point P (x, y) shown in FIG. 2 as an indication of the auxiliary information to be presented to the photographer.

For example, if the LED light source 70 is regularly kept in an off-state and is turned on only when a focusing state is achieved in photographing, the indication P' of the auxiliary information is to be visually recognized on the finder only when a focusing state is achieved and the indication P' can be utilized as a focusing state indicator. That is, the photographer can recognize that a focusing state is achieved if the point of the indication P' emits light.

Although FIG. 2 shows an example where the auxiliary light L2 is output only at one point P (x, y), the auxiliary light L2 may be output at multiple points on the plate-like diffractive element 50 so that desired auxiliary information is displayed, respectively, at multiple points on the finder. It will be appreciated that linear or planar auxiliary information can also be displayed, and further literal auxiliary information can also be displayed.

An important point here is that when the light L0 introduced into the liquid-crystal main body layer 52 shown in FIG. 2 is diffracted and output in the direction of the Z axis, the output light (i.e. auxiliary light L2) is linearly-polarized. On the contrary, the subject light L1 passing through the plate-like diffractive element 50 suffers no change in polarization property. Therefore, among the synthetic light L12 output through the plate-like diffractive element 50 upward in the drawing (in the direction of the Z axis), the subject light L1 is kept non-polarized, while the auxiliary light L2 is linearly-polarized, resulting in a difference in polarization property therebetween.

It is noted that the plate-like diffractive element 50 having such an optical characteristic is a well-known optical element generally called a "liquid-crystal hologram switching element" and marketed, for example, under the trade name "Switchable Bragg Grating" by SBG Labs, Inc. of the U.S. This commercially available optical element is a plate-like diffractive element of HPDLC (Holographic Polymer Dispersed Liquid Crystal) and has a feature that voltage applied areas emit no light while voltage non-applied areas emit light. Therefore, voltage control using TFT, etc., is required for each pixel instead of light-emitting position control using linear electrodes as shown in FIG. 2. However, functions as a diffractive element are the same as those of the element shown in FIG. 2.

As shown in FIG. 3, the photographer may look into the finder 100 to observe the indication P' of the auxiliary information in a superimposed manner on the subject image 15. This is for the reason that both the subject light L1 and the auxiliary light L2 that constitute the synthetic light L12 reach the eye of the photographer. However, the auxiliary light L2 is to be excluded from the synthetic light L12 incident on the photometric means 140 based on the above-described different polarization properties. That is, as shown in FIG. 1, the auxiliary light separating means 130 for separating the subject light L1 and the auxiliary light L2 based on the different polarization properties is provided in front of the photometric means 140, and the auxiliary light separating means 130 functions so that light excluding the auxiliary light L2 is incident on the photometric means 140.

The auxiliary light separating means 130 may be any optical element as long as it has a function of separating the subject light L1 and the auxiliary light L2 that constitute the synthetic light L12 based on the difference in polarization property therebetween and then guiding only the subject light L1 toward the photometric means 140. It will be appreciated that it is actually difficult to separate the subject light L1 and the auxiliary light L2 100% perfectly and it is therefore impossible to perfectly prevent the auxiliary light L2 from entering the photometric means 140. Thus, the auxiliary light separating means 130 is only required to be an optical element which achieves a separating effect that allows for measurements by the photometric means 140 at a practically trouble-free accuracy and is not required to exclude the auxiliary light L2 perfectly from light incident on the photometric means 140.

The most simple optical element as the auxiliary light separating means 130 is a polarizing plate. The auxiliary light L2 can be excluded from the synthetic light L12 by employing a polarizing plate having a feature of shielding or reflecting specified linearly-polarized components contained in the auxiliary light L2 as the auxiliary light separating means 130.

Figure 4:
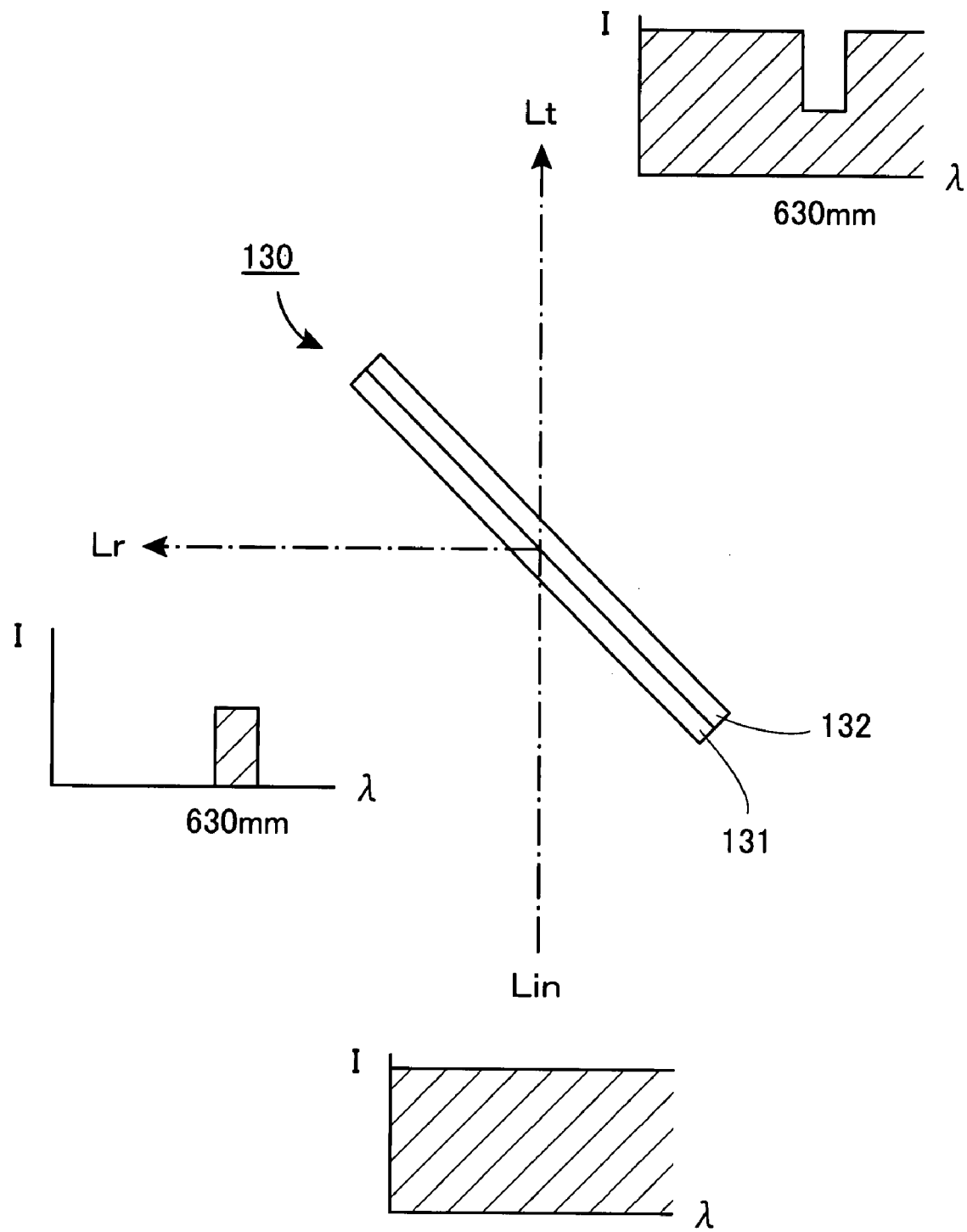
FIG. 4 is a side view showing a configuration example of the auxiliary light separating means 130 shown in FIG. 1.

In accordance with experiments performed by the inventor, the separation result was most effective when a polarization separating element of cholesteric liquid crystal with such a lateral shape as shown in FIG. 4 is employed as a part of the auxiliary light separating means 130. The auxiliary light separating means 130 shown in FIG. 4 is a laminated structure including a ¼-wavelength plate 131 and a plate-like polarization separating element 132 of cholesteric liquid crystal.

The plate-like polarization separating element 132 includes cholesteric liquid crystal molecules arranged in laminae, in which molecules in each layer are aligned in one direction, and further the direction changes little by little from one layer to the next layer. The structure and features of such a polarization separating element of cholesteric liquid crystal are disclosed in Japanese Patent Laid-open Publication No. 2003-139931A, for example. The most prominent polarization property of this element is to reflect left- or right-handed circularly-polarized components within a certain wavelength range contained in incident light arriving at one principal plane, while to pass the remaining light components therethrough. The wavelength range within which light components are reflected depends on the type of liquid crystal and the laminar structure of the element. The following descriptions are based on the assumption that a plate-like polarization separating element 132 having a feature of reflecting light components having wavelengths around 630 nm is employed.

Meanwhile, the ¼-wavelength plate 131 is widely known as an optical element having a feature that linearly-polarized incident light would be converted into circularly-polarized light to pass therethrough, while circularly-polarized incident light would be converted into linearly-polarized light to pass therethrough. In the auxiliary light separating means 130 shown in FIG. 4, the ¼-wavelength plate 131 is laminated on the plate-like polarization separating element 132 of cholesteric liquid crystal.

Here, it is assumed that the auxiliary light separating means 130 is arranged at a tilt angle of 45 degrees as shown in the drawing and white incident light Lin is incident from below to above in the drawing. The graph in the lower part of FIG. 4 shows the spectrum of the white incident light Lin, where the horizontal axis represents wavelength $\lambda$ while the vertical axis represents light intensity I. The light passes through the ¼-wavelength plate 131 so that linearly-polarized components contained in the white incident light Lin are converted into circularly-polarized components and then light components having wavelengths around 630 nm are reflected at the plate-like polarization separating element 132 to travel leftward in the drawing as reflected light Lr. The spectrum of the reflected light Lr includes only circularly-polarized components of a wavelength around 630 nm as shown in the drawing. Meanwhile, the remaining components pass through the plate-like polarization separating element 132 as transmitted light Lt. The spectrum of the transmitted light Lt lacks circularly-polarized components of a wavelength around 630 nm as shown in the drawing.

It is hence assumed that the LED light source shown in FIG. 1 is a red LED for emitting light of a wavelength around 630 nm, the auxiliary light separating means 130 shown in FIG. 1 is such a laminated structure as shown in FIG. 4, and reflected light (synthetic light L12) from the branched light mirror 110 is incident on the auxiliary light separating means 130 in the direction of the white incident light Lin shown in FIG. 4. As described above, the auxiliary light L2 contained in the synthetic light L12 is linearly-polarized and also has a wavelength around 630 nm. Therefore, the auxiliary light L2 passes through the ¼-wavelength plate 131 to be circularly-polarized and is reflected at the plate-like polarization separating element 132 to be excluded in the direction of the reflected light Lr shown in the drawing. Consequently, the light traveling in the direction of the transmitted light Lt shown in the drawing excludes the auxiliary light L2. Accordingly, light can be measured accurately without the effect of the auxiliary light L2 by guiding the transmitted light Lt toward the photometric means 140. It will be appreciated that the auxiliary light L2 cannot actually be excluded 100%, but a sufficient exclusion effect will be achieved in practice.

Although for the sake of descriptive convenience, an example where the LED light source 70 is a red LED for emitting light of a wavelength around 630 nm and a plate-like polarization separating element 132 having a feature of reflecting light components having wavelengths around 630 nm is employed has heretofore been described, these wavelengths may be selected arbitrarily as usage. That is, the object of the present invention can be achieved if the auxiliary light synthesizing means has a function of generating auxiliary light having a wavelength characteristic mainly within a certain wavelength range, the plate-like polarization separating element 132 of cholesteric liquid crystal has a feature of selectively reflecting circularly-polarized light within the certain wavelength range, and light passing through the plate-like polarization separating element 132 is guided toward the photometric means 140.

What is claimed is:

1. A camera with a photometric function comprising:
   an optical system guiding subject light incident through a photo-taking lens toward a finder;
   an auxiliary light synthesizing unit generating auxiliary light to display auxiliary information in a superimposed manner on a subject image on the finder and generating synthetic light by synthesizing the subject light with the auxiliary light;
   a light branching unit extracting part of the synthetic light toward the finder as branched light; and
   a photometric unit measuring an intensity of the branched light to determine correct exposure, wherein
   the auxiliary light synthesizing unit has a function of generating the synthetic light in which the subject light and the auxiliary light have their respective different polarization properties, and
   an auxiliary light separating unit separating the subject light and the auxiliary light based on the different polarization properties is provided between the light branching unit and the photometric unit so that light excluding the auxiliary light is incident on the photometric unit.

2. The camera with a photometric function according to claim 1, wherein
   auxiliary information indicating a focusing state or a focusing position is displayed in a superimposed manner on a subject image on the finder.

3. The camera with a photometric function according to claim 1, wherein
   the auxiliary light synthesizing unit has a function of generating synthetic light by synthesizing non-polarized subject light with linearly-polarized auxiliary light, and
   the auxiliary light separating unit is adapted to exclude the auxiliary light based on the linear polarization property of the auxiliary light.

4. The camera with a photometric function according to claim 3, wherein
   the auxiliary light synthesizing unit comprises:
   an LED light source for generating auxiliary light;
   a transparent plate-like diffractive element having a flat plate structure with an XY plane as a principal plane and having a function of diffracting light introduced through a side surface thereof at any coordinate point (x, y) to introduce light outside as linearly-polarized auxiliary light; and
   a light guide member for guiding light generated in the LED light source toward the side surface of the plate-like diffractive element.

5. The camera with a photometric function according to claim 4, wherein
   the plate-like diffractive element comprises:
   a liquid-crystal main body layer composed of liquid crystal filling a plate-like area;
   an upper electrode layer disposed on an upper surface of the liquid-crystal main body layer and having an entirely transparent plate-like structure with many transparent linear electrodes formed parallel with a Y axis direction; and
   a lower electrode layer disposed on a lower surface of the liquid-crystal main body layer and having an entirely transparent plate-like structure with many transparent linear electrodes formed parallel with an X axis direction,
   the plate-like diffractive element having a feature that light introduced into the liquid-crystal main body layer is diffracted and output in a direction of a Z axis at an intersection of a pair of certain transparent linear electrodes selected from the transparent linear electrodes formed in the respective upper and lower electrode layers by applying a predetermined drive voltage between the pair of selected transparent linear electrodes.

6. The camera with a photometric function according to claim 1, wherein
   the auxiliary light separating unit is a polarizing plate.

7. The camera with a photometric function according to claim 1, wherein
   the auxiliary light separating unit is a polarization separating element of cholesteric liquid crystal.

8. The camera with a photometric function according to claim 3, wherein
   the auxiliary light separating unit is a laminated structure including a plate-like polarization separating element of cholesteric liquid crystal and a ¼-wavelength plate.

9. The camera with a photometric function according to claim 8, wherein
   the auxiliary light synthesizing unit has a wavelength characteristic mainly within a certain wavelength range and has a function of generating linearly-polarized auxiliary light, and
   the plate-like polarization separating element of cholesteric liquid crystal has a feature of selectively reflecting circularly-polarized light within the certain wavelength range and is adapted to guide light passing through the plate-like polarization separating element toward the photometric unit.

10. An optical element for use in a camera with a photometric function, said camera comprising:
    an optical system guiding subject light incident through a photo-taking lens toward a finder;
    an auxiliary light synthesizing unit generating auxiliary light to display auxiliary information in a superimposed manner on a subject image on the finder and generating synthetic light in which the subject light and the auxiliary light have their respective different polarization properties by synthesizing the subject light with the auxiliary light;
    a light branching unit extracting part of the synthetic light toward the finder as branched light; and a photometric unit measuring an intensity of the branched light to determine correct exposure, wherein said optical element having a shape suitable to be arranged between the light branching unit and the photometric unit and having an optical characteristic of separating the subject light and the auxiliary light based on the different polarization properties so that light excluding the auxiliary light is incident on the photometric unit.

11. The optical element for use in a camera with a photometric function according to claim 10, wherein light having a linear polarization property is adapted to be excluded, while light having no linear polarization property is adapted to be guided toward the photometric unit based on the linear polarization property of the auxiliary light.

12. The optical element for use in a camera with a photometric function according to claim 11, wherein light having a linear polarization property is adapted to be separated using a polarization separating element of cholesteric liquid crystal.

13. The optical element for use in a camera with a photometric function according to claim 12, wherein a laminated structure including a plate-like polarization separating element of cholesteric liquid crystal and a ¼-wavelength plate is provided.

14. The optical element for use in a camera with a photometric function according to claim 13, wherein the plate-like polarization separating element of cholesteric liquid crystal has a feature of selectively reflecting circularly-polarized light within a certain wavelength range of the auxiliary light.

15. The camera with a photometric function according to claim 2, wherein the auxiliary light synthesizing unit has a function of generating synthetic light by synthesizing non-polarized subject light with linearly-polarized auxiliary light, and the auxiliary light separating unit is adapted to exclude the auxiliary light based on the linear polarization property of the auxiliary light.

* * * * *